(12) United States Patent
Hu

(10) Patent No.: US 8,678,899 B2
(45) Date of Patent: Mar. 25, 2014

(54) GAME SHOW WITH SPECIALIZED VOTING PROCEDURE

(75) Inventor: William Hu, New York, NY (US)

(73) Assignee: CEM International Limited, Andar, Macau ( * ) Notice: Subject to any disclaimer, the term of this patent is extended or adjusted under 35 U.S.C. 154(b) by 0 days.

(21) Appl. No.: 13/219,146

(22) Filed: Aug. 26, 2011

(65) Prior Publication Data

US 2013/0053115 A1    Feb. 28, 2013

(51) Int. Cl.
| | | |
|---|---|---|
| A63F 9/24 | (2006.01) | |
| A63F 13/00 | (2006.01) | |
| G06F 17/00 | (2006.01) | |
| G06F 19/00 | (2011.01) | |
| G06F 11/00 | (2006.01) | |
| G07C 13/00 | (2006.01) | |

(52) U.S. Cl.
USPC .................................. 463/9; 463/40; 705/12

(58) Field of Classification Search
USPC ......................................... 463/9, 40; 705/12
See application file for complete search history.

(56) References Cited

U.S. PATENT DOCUMENTS

| | | | | |
|---|---|---|---|---|
| 2002/0103696 A1* | 8/2002 | Huang et al. | ..................... | 705/12 |
| 2003/0060264 A1* | 3/2003 | Chilton et al. | .................. | 463/20 |
| 2006/0178195 A1* | 8/2006 | Walker et al. | .................. | 463/17 |
| 2006/0246990 A1* | 11/2006 | Downes | ......................... | 463/16 |
| 2007/0112648 A1* | 5/2007 | Martin | ......................... | 705/27 |
| 2007/0155411 A1* | 7/2007 | Morrison | ....................... | 455/466 |
| 2007/0169143 A1* | 7/2007 | Li | ................................... | 725/23 |
| 2007/0174244 A1* | 7/2007 | Jones | ............................... | 707/3 |
| 2009/0029773 A1* | 1/2009 | Cherry | ............................ | 463/42 |

* cited by examiner

*Primary Examiner* — Arthur O Hall
*Assistant Examiner* — Wei Lee
(74) *Attorney, Agent, or Firm* — Dickstein Shapiro LLP

(57) ABSTRACT

A method of providing a game show that includes broadcasting performances from a plurality of contestants to audience members and receiving lists from the audience members. Each list received contains the identifiers of at least two contestants. These lists are tabulated and a vote is recorded for a contestant each time the identifier for that contestant appears on a list. The contestants are then ranked in order of the number of votes each received, with the contestant who received the least votes ranked first. The contestant with the most votes and/or the contestant with the least votes are named the winner. The group of audience members who submitted lists that rank the contestants in order of who received the fewest votes to who received the most votes also win.

17 Claims, 3 Drawing Sheets

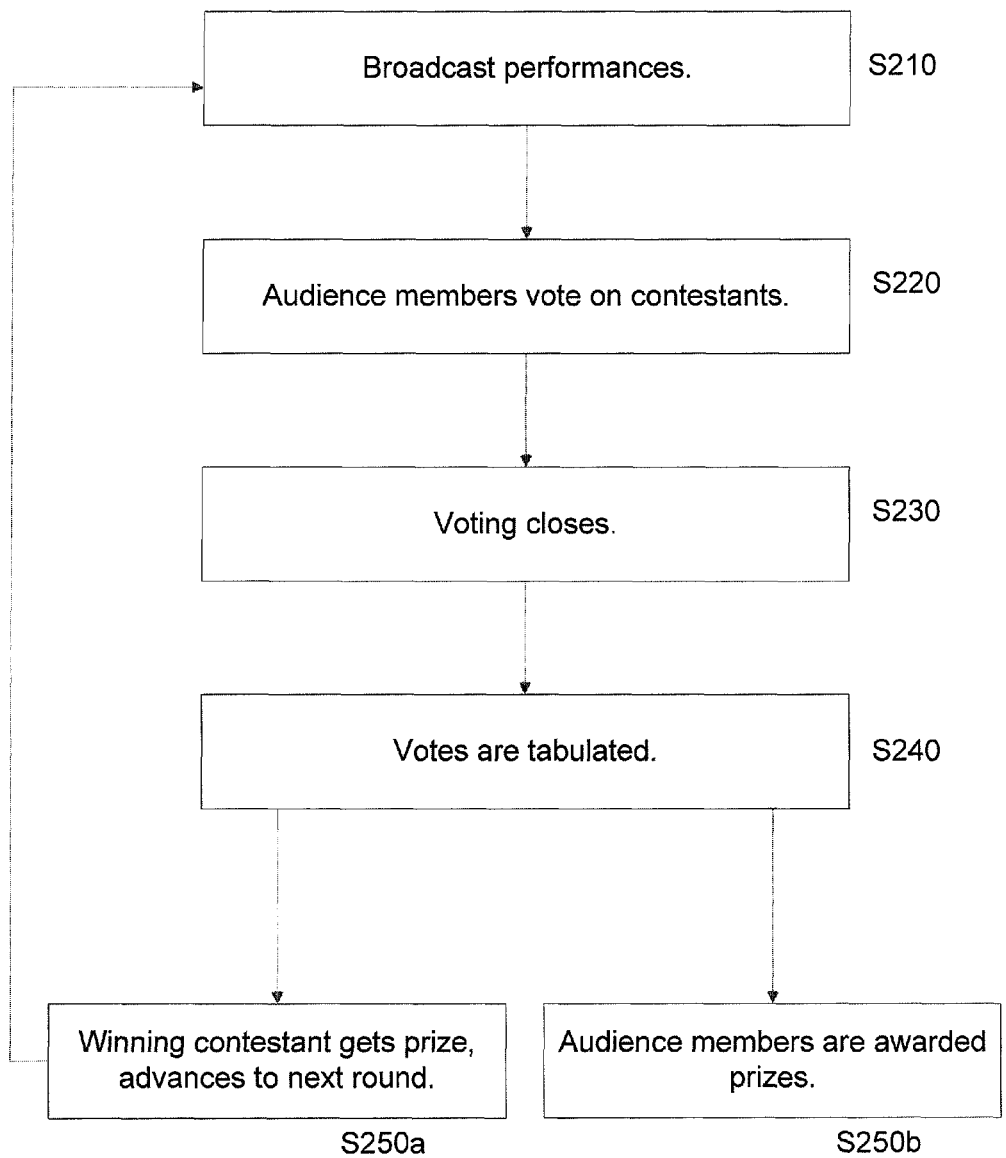

GAME SHOW WITH SPECIALIZED VOTING PROCEDURE

FIELD OF INVENTION

The present invention relates to a system and method for a game show that tabulates votes from audience members for contestants in a competition and awards prizes to: (1) the contestant who received the most votes, (2) the contestant who received the least votes and (3) the audience members who submitted ballots that correctly ordered at least a subset of the contestants who received the lowest number of audience votes.

BACKGROUND OF INVENTION

Game shows today follow a format where audience members vote for their favorite contestants and the contestant with the fewest number of votes is eliminated from the competition in succeeding rounds of play until only a single winner remains. The contestant with the most votes ultimately wins and the only reward that the audience members receive is the satisfaction of helping a favorite win the game show.

Although audience members may feel emotionally invested in a contestant and vote to keep that contestant on the game show, the audience members are not rewarded for their participation in the voting process of the game show. Also, the voting process is somewhat straightforward and requires no strategy: the audience member votes for the contestant he or she wants as the winner. If the majority of other audience members vote for the same contestant, that contestant wins.

On other types of game shows, the contestants themselves vote to eliminate a least favorite contestant. This is a departure from the model of voting for a winner. However, on this type of game show, the viewing audience also has no control over the result and no stake in the outcome.

Another common factor in many game shows, particularly those that showcase the talents of the contestants, including but not limited to, singing and dancing, is that the ultimate winner is often unsurprising. Although recognition of talent is subjective, there are generally contestants that are objectively more talented than other contestants. These objectively talented contestants progress through the competition until one is named the winner. The conclusion of a game show is less exciting when the winner is easy to predict. When a contestant dominates a competition, the audience members may lose interest in the results and stop voting, and/or stop watching. If voting costs money, that money is lost. Lower audience membership will affect advertising, which will also affect revenue.

To maximize the viewership of a game show, the need exists for a game show where the winner is a surprise to the audience. Additionally, the need exists for a game show that gives the audience members a greater stake in the results.

SUMMARY OF INVENTION

The present invention is a game show where both audience members and contestants are eligible to receive prizes. Contestants receive prizes based on receiving and/or failing to receive votes from audience members. Audience members receive prizes by predicting which contestants will receive the fewest votes. However, each time an audience member submits a prediction as to which contestant will receive the fewest votes, that prediction counts as a vote in favor of the contestant.

The present invention provides a unique game show that allows audience members to simultaneously vote for contestants while qualifying to win a prize for correctly ranking all or a subset of the contestants in the order of the contestant receiving the least votes to the contestant receiving the most votes. While the audience members are competing for prizes, the contestant who receives the most votes and/or the contestant who receives the least votes also receive a prize and advances to the next round, if such next round exists and where he or she has the opportunity to win another prize.

In one embodiment of the invention, the game show comprises at least three contestants performing for an audience. These performances may be live, or may be pre-recorded. The audience members may view these performances in person, via television, Internet, cellular phone or through any other broadcast media. For ease, each contestant may be assigned an identifier, for example, a number, that the audience can then use in voting.

In this embodiment, each audience member may vote by ranking all or a subset of the performers and then submitting a ballot with these rankings. Voting can be accomplished by any telephone or electronic voting means including but not limited to by telephone, various hand-held mobile devices, Internet, or text message. For example, if three contestants perform, the broadcasters may solicit ballots with lists of two of the performers. Each audience member can vote as many times as he or she desires and the votes can feature different rankings. Optionally, the audience members may be charged a fee for each vote they submit.

The audience members' votes are collected and tabulated by incrementing the vote total for a given contestant each time that contestant is listed on a ballot. In one embodiment, for the purpose of tabulating votes, it does not matter how the contestant ranked on each ballot, but merely that the contestant appeared on the ballot. If a ballot identifies contestants 1 and 3, then, contestants 1 and 3 will each receive a vote based on that ballot.

Once the results are tabulated, the contestant with the highest number of votes may advance to the next round of competition. Additionally, the contestant with the lowest number of votes may also advance to the next round of competition. These contestants may receive a prize. In the next round, if such exists, these contestants will perform again, but will be preferably competing against a new pool of contestants, or against the contestants remaining from the previous round, or a combination thereof The audience will again vote by ranking the contestants in the new round.

Audience members whose votes reflect the order of the losing contestants from the contestant who received the fewest votes to the contestant who received the most votes may also receive prizes or are eligible to receive prizes. For example, if a ballot lists 1, 3, and contestant 1 received the fewest votes and contestant 3 received the next fewest votes, then the audience member or members who submitted this ballot is/are a winner and awarded a prize.

BRIEF DESCRIPTION OF DRAWINGS

FIG. 2 depicts a workflow diagram of an embodiment of the present invention.

FIG. 3 depicts a sample ballot submitted by an audience member in an embodiment of the present invention.

DETAILED DESCRIPTION OF THE INVENTION

Figure 1:
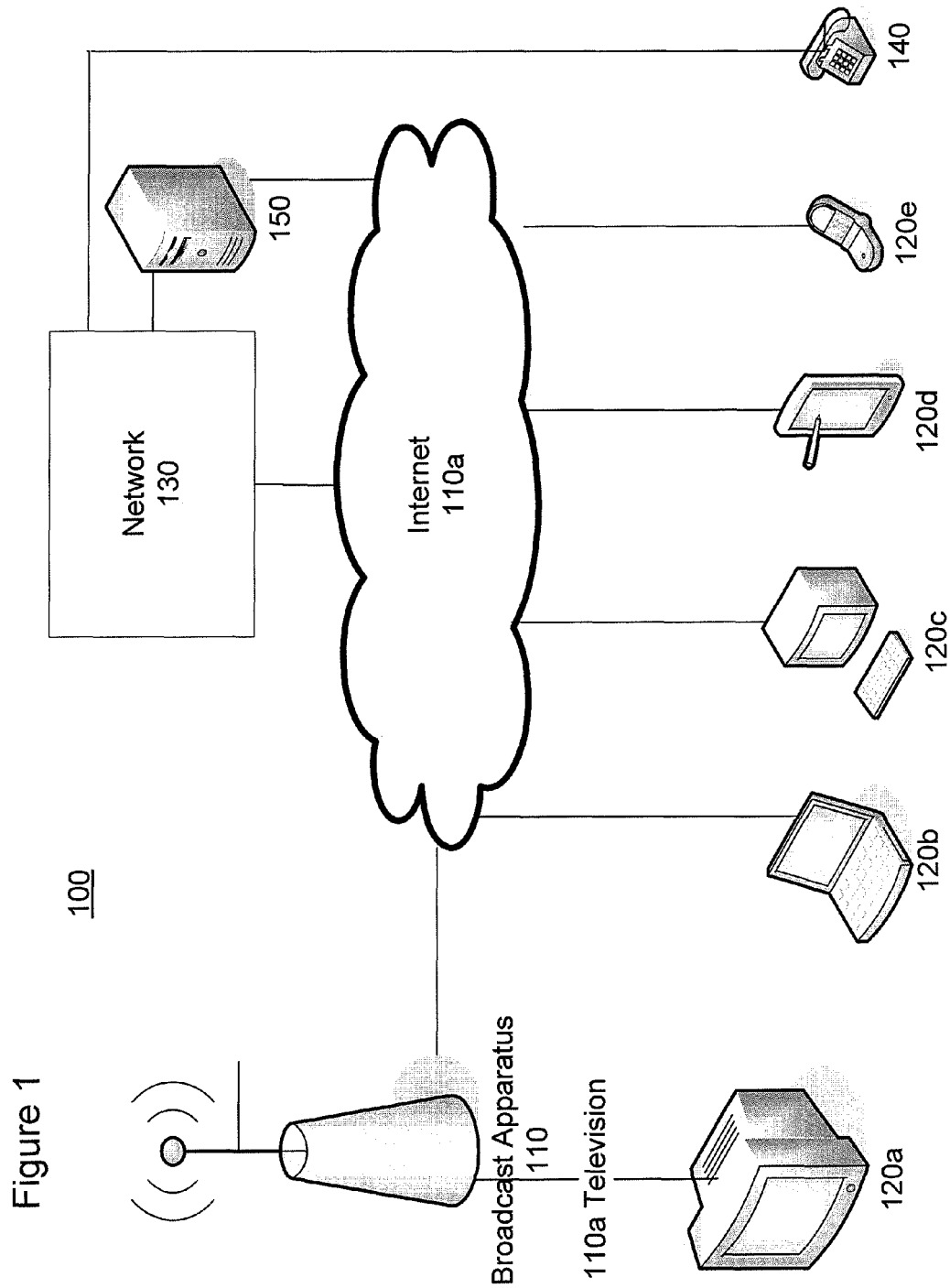
FIG. 1 depicts a technical architecture used to practice an embodiment of the present invention.

FIG. 1 is the technical architecture 100 of an embodiment a system used to practice the method of the invention. FIG. 1 includes a broadcasting apparatus 110 that broadcasts the performances of game show contestants over various media sources including, but not limited to, television 110a, and Internet 110b. Audience members view the performances using user terminals 120a-e, including, but are not limited to, televisions, data terminals, workstations, portable computers, and/or smart phones, which are connected to the television 110a, and/or Internet 110b, networks.

After the audience members view the performances, they may vote for the contestants over a telecommunications network 130 using user terminals 120a-e, and/or a telephone 140. The votes that are received are pooled and tabulated by server 150.

In one embodiment, a fee may be associated with various methods of voting. For example, votes by phone can be made to toll numbers. Votes on smart phones via text message may also carry a fee per vote. Audience members who vote via a Web Browser, may be required to input their credit and/or debit card numbers before casting votes. Audience members may also be required to purchase and download specialized software to their user terminals before being able to place votes.

In another embodiment, placing votes is free for audience members, but audience members are required to watch advertisements before they can place votes. For example, phone audience members may be required to listen to an advertisement before placing a vote, while audience members using a Web Browser may see an advertisement displayed in their Web Browsers before viewing the options to place a vote.

Referring to FIG. 2, the first step of the workflow 200 of the game show is broadcasting the performances of the contestants to an audience (S210). Audience members may observe the performances live in the studio as well as remotely via television and/or the Internet. The performances may be broadcast live or taped and then broadcast at a scheduled time.

The types of performances by the contestants may vary depending on the desired audience for the program, the time slot, or any other factors that would impact the viewership and popularity of the show. Performances may include, but are not limited to, exhibitions of talents in the dramatic arts, such as singing, dancing, stand up comedy and/or reciting monologues. Talents may also include, but are not limited to, odd demonstrations such as feats of strength, contortions, imitations, animal wrangling, juggling, pantomime, and/or animal calls.

For ease of identification, rather than listing the contestants by name, the contestants may be assigned contestant numbers. These contestant numbers may be used later to easily identify the contestants during the voting process. For example, if the contestants are assigned numbers, voting by methods that limit character entry, such as text message, will be easier for audience members to use.

Once the performances of the contestants have been broadcast to the audience members (S210), the audience members have an opportunity to vote for the contestants (S220). The audience members vote by ranking all or a subset of the contestants in an order that the audience member believes will be the lowest vote receiver to the highest vote receiver, and submit this ranking to the television network or the Web Site that is airing the competition. Whether the audience members should rank all or a subset of the contestants is a determination that may be made by the broadcaster before accepting votes for the performances. If, for example, ten contestants perform, broadcasters may ask the audience members to rank only the five lowest vote receiving contestants.

Figure 3:
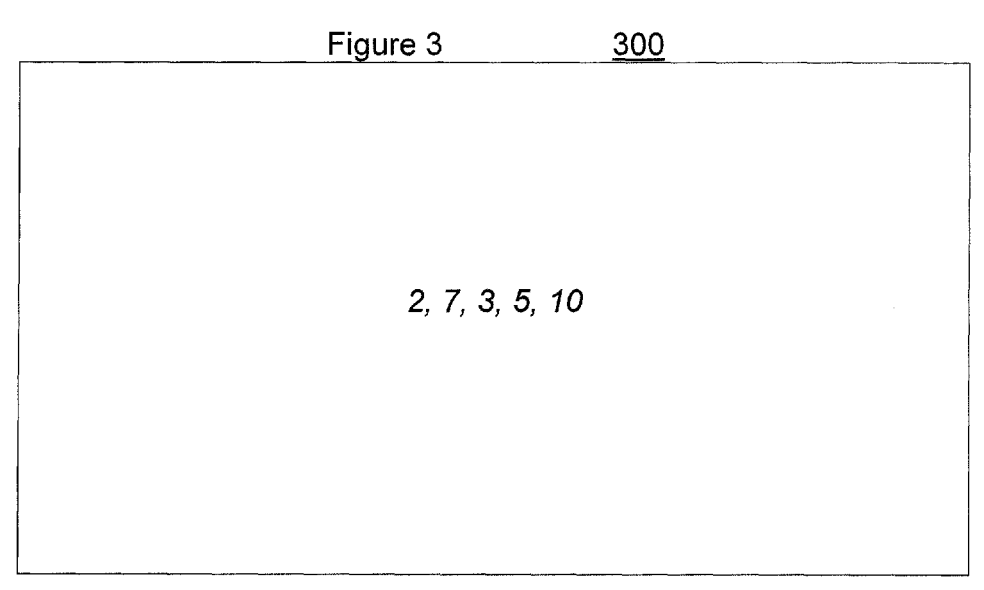

FIG. 3 depicts a sample ballot where the audience member has ranked the lowest five of ten contestants by their contestant number. Each ballot submitted by an audience member is a prediction by that audience member of which contestants will receive the fewest votes in a specified order. The contestant ranked first by the audience member is the contestant that audience member guesses will receive the fewest audience votes. The contestant ranked second by the audience member is the contestant that audience member predicts will receive the second least number of votes, and so on.

By submitting the ballot in FIG. 3, the audience member has predicted that contestant 2 will receive the fewest votes, contestant 7 will receive the second fewest votes, contestant 3 will receive the third fewest votes, contestant 5 will receive the fourth fewest votes, and contestant 10 will receive the fifth fewest votes.

By ranking the contestants and submitting a vote, the audience members are casting votes as well as predicting which contestants will receive the fewest votes. In other words, each time a contestant is listed on a ballot that is submitted by an audience member, at least one vote is tabulated for that contestant. In one embodiment, every time a contestant is listed on a ballot, that contestant receives one vote. In another embodiment, a contestant that appears on a ballot is assigned a certain number of votes depending upon where the audience member positions the contestant in the rankings on his or her ballot. The rank to vote ratio may be one-to-one or any other ratio that the producers of the game show determine to make the show competitive and engaging for the audience members. By submitting the ballot in FIG. 3, the audience member is voting at least once for contestants 2, 7, 3, 5, and 10.

The broadcasters may choose to limit the number of times an audience member can vote or the number of different ballots the audience member can submit. The broadcasters may also allow unlimited submissions by audience members.

In one embodiment of the invention, the broadcasters of the game show will close the voting after finite periods in various locations (S230). After this interval is over, no more ballots will be accepted from audience members. In another embodiment of the invention, the broadcasters may stop accepting votes after a certain threshold of votes is met.

Once voting has closed, the votes are tabulated (S240) to determine the contestant who is the winner and the audience member(s) who is/are winner(s). Depending on the technology employed, the tabulation of the votes (S240) may be concurrent with the voting process.

In an embodiment of the invention, the contestant who received the most votes from the audience members is the winner. As the winner, this contestant receives a prize and advances to the next round of play (S250a), if such exists, where he or she will perform again as part of a new group of contestants (S210). In another embodiment of the invention, the contestant who received the least votes from the audience members is the winner. As the winner, this contestant receives a prize and advances to the next round of play. In another embodiment of the invention, both the contestant who received the most votes and the contestant who received the least votes are the winners, receive a prize, and advance to the next round, should one exist.

In the rare event that two or more contestants receive the same number of votes, the game show can be adjusted to accommodate this event. Should there be a tie for the contestants with the most votes or the least votes, all tied contestants may advance to the next round and receive prizes. If the tie is anywhere within the sequence that the audience members must submit to win, audience members with any combination of the tied players will win. For example, if audience members are instructed to submit two contestant numbers and contestants 1 and 2 tie for the least amount of votes, audience members who submit "1, 2" and those who submit "2, 1" will both win.

Any audience member who submitted a ballot that correctly ranked all or a requested subset of the contestants from the contestant with the least amount of votes to the contestant with the most amount of votes, is a winner and is awarded a prize (S250b). In one embodiment, every prize awarded to a winner, whether a contestant or an audience member winner, is a portion of a prize pool. The contestants who received the most and least votes may be awarded a set percentage of the prize pool or advanced to the next round of the game show, if any. The prize pool includes but is not limited to a sum of money and/or vouchers for goods and/or services. In this embodiment, the remainder of the prize pool, or the grand prize, is shared evenly among the audience members who guessed the correct order. In another embodiment, the audience member who guessed the correct order and submitted his/her ballot first in time receives the entire grand prize.

In one embodiment of the invention, if no audience member accurately ranks the contestants, the grand prize that would be awarded to the audience is not awarded. This grand prize may be combined with the grand prize for the next round and the larger grand prize is awarded to the winner(s) of the next round.

Audience members who receive prizes as well as those who do not are invited to continue voting in subsequent rounds of the game show.

Although the present invention has been described in relation to particular embodiments thereof, many other variations and modifications will become apparent to those skilled in the art. As such, it will be readily evident to one of skill in the art based on the detailed description of the presently preferred embodiment of the system and method explained herein, that different embodiments can be realized.

The invention claimed is:

1. A method of providing a game show, comprising:
broadcasting performances from a plurality of contestants to audience members;
a server receiving a plurality of votes from audience members wherein each vote of said plurality of votes includes an identifier representing at least one of said plurality of contestants;
the server tabulating said plurality of votes;
the server identifying at least one disfavored contestant from said plurality of contestants, said at least one disfavored contestant having received a least number of votes; and
the server selecting at least one audience member from a subset of said plurality of audience members consisting of audience members who voted for the at least one disfavored contestant.

2. The method of claim 1, further comprising identifying a winning contestant from said plurality of votes, said winning contestant having received a greatest number of votes.

3. The method of claim 1, further comprising identifying a winning contestant from said plurality of votes, said winning contestant is the at least one disfavored contestant.

4. The method of claim 1, further comprising identifying a first winning contestant and a second winning contestant from said plurality of votes, said first winning contestant having received the greatest number of votes and said second winning contestant being the at least one disfavored contestant.

5. The method of claim 1, further comprising providing a monetary award to the at least one audience member.

6. The method of claim 1, further comprising collecting a fee for each of said plurality of votes.

7. A method of providing a game show, comprising:
broadcasting performances from a plurality of contestants to audience members;
a server receiving a plurality of lists from audience members wherein each list contains at least two identifiers representing at least two of said plurality of contestants;
the server tabulating said plurality of lists wherein each instance of an identifier on one of said plurality of lists comprises a vote for the contestant matching the identifier;
the server ranking said plurality of contestants in an order in accordance with the number of votes each contestant received, wherein a disfavored contestant of said plurality of contestants who received a least number of votes is ranked first;
the server selecting at least one audience member from a subset of said plurality of audience members consisting of audience members who identified at least two of said plurality of contestants in the same sequence as the order.

8. The method of claim 7, further comprising identifying a winning contestant from said plurality of contestants, wherein said winning contestant received a greatest number of votes.

9. The method of claim 7, further comprising identifying a winning contestant from said plurality of contestants, wherein said winning contestant is the disfavored contestant.

10. The method of claim 7, further comprising identifying a first winning contestant and a second winning contestant from said plurality of contestants, wherein said first winning contestant is the disfavored contestant and said second winning contestant received the greatest number of votes.

11. The method of claim 7, wherein a first identifier of the at least two identifiers represents the contestant who received the least number of votes.

12. The method of claim 7, further comprising collecting a fee for each of said plurality of lists.

13. The method of claim 7, further comprising requiring audience members to view advertising footage while receiving said plurality of lists.

14. The method of claim 7, further comprising providing an award to the at least one audience member.

15. The method of claim 14, wherein said award is a monetary sum.

16. The method of claim 14, wherein said award is a voucher.

17. A game show comprising:
a broadcasting apparatus for capturing and transmitting performances of a plurality of contestants to a plurality of audience members; and
a processor configured to:
receive a plurality of votes from said audience members wherein each vote of said plurality of votes includes an identifier representing at least one of said plurality of contestants;
tabulate said plurality of votes;
identify at least one disfavored contestant from said plurality of contestants, said at least one disfavored contestant having received a least number of votes; and
select at least one audience member from a subset of said plurality of audience members consisting of audience members who voted for the at least one disfavored contestant.

* * * * *